United States Patent Office 3,448,235
Patented June 3, 1969

---

3,448,235
CONDUCTIVE SPIRAL TUBE
WELDING APPARATUS
Karl Schmidt, Erlangen, Germany, assignor to Siemens-Schuckertwerke Aktiengesellschaft, Erlangen, Germany, a corporation of Germany
Filed Nov. 7, 1966, Ser. No. 592,646
Int. Cl. B23k *11/08, 1/16*
U.S. Cl. 219—62      2 Claims

---

ABSTRACT OF THE DISCLOSURE

Helical or spiral seam tube welding apparatus in which high frequency contacts are located in advance of the weld point at the inner surface of the spiral-seam tube and the outer surface of the tangentially-advanced metal strip being formed into such tube; with the leads for such contacts extending between the weld point and the contacts near the edges of the strip and tube to be joined by welding.

---

Figure 1:
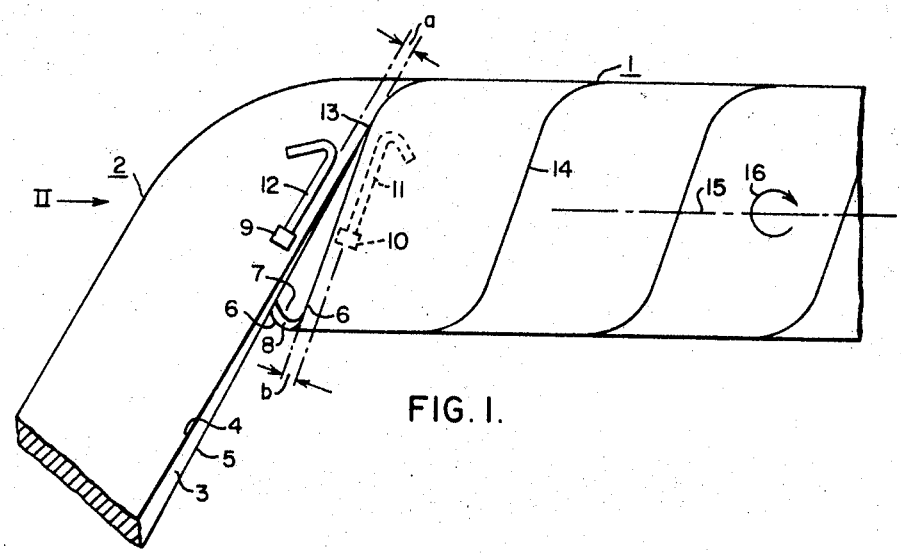

There is a well-known process for manufacturing tubes of larger diameter, the process consisting in winding a tangentially-approaching strip of metal spirally into a tube of the desired diameter. At the point where the edge-face of the strip to be wound meets the edge-face of the already-wound tube, the heated edge-faces of the said tube and strip are welded together to form a spiral seam-weld on the finished tube, from which the process takes its name. In order to heat the edge-faces, sliding contacts are applied ahead of the welding place to the strip and to the surface of the tube. High frequency heating current is fed in via the said contacts which, because of the skin-effect, flows primarily to the edge faces to be welded at the location where the strip meets the tube.

However, any uneven or unsatisfactory strength of the tube can be attributed directly to a non-uniform heating current density which produces uneven heating thicknesses at the edges. Attempts to reduce this drawback by developing a suitable form of contact have not led to any completely satisfactory results, particularly at relatively great tube wall thicknesses. This is because the proximity effect also is primarily responsible for the uneven current density thicknesswise at the adjacent edges of the tangential strip and the cylindrical tube; the general nature of the proximity effect being that in the case where the current flows in opposite directions in adjacent conductors, the current density is increased in the sides facing each other, and reduced in the sides facing away; the reverse holding true for currents flowing in the same direction.

Quite independent of how the two feed-current contacts are constructed or applied, the two currents flowing into the welding place along the tangential strip and cylindrical tube will consequently attract each other, i.e. the highest current density will occur on the strip and tube portions which lie closer to each other, whereas the current density will be reduced on the more remote respective portions. As a result of this, uneven distribution of the current tends to result, as well as an uneven heating thicknesswise of the strip and tube wall, even with straight (uniform) edge-faces and, as already pointed out, this tends to limit the permissible wall thickness and/or attainable quality of the welded product.

In view of the foregoing remarks, it becomes an object of the present invention to overcome such tendency for uneven heating of the strip and tube edges in thick wall spiral tube welding by conduction. In accordance with the invention, this objective is attained by providing current leads to the contacts which lie closely adjacent to the inner and outer surfaces of the tube and strip respectively, near their adjacent edges to be welded together, and which extend between such contacts and the weld point. By this means, by the employment of two additional proximity effects, one obtains the required current density throughout the thickness not only in the edge-face of the tube but also in the edge-face of adjoining metal strip. Advantageously, as a result of this, more freedom for location of the contacts associated with the adjacent leads is afforded so that an optimum welding condition can more readily be provided for different tube materials and wall thicknesses.

Figure 2:
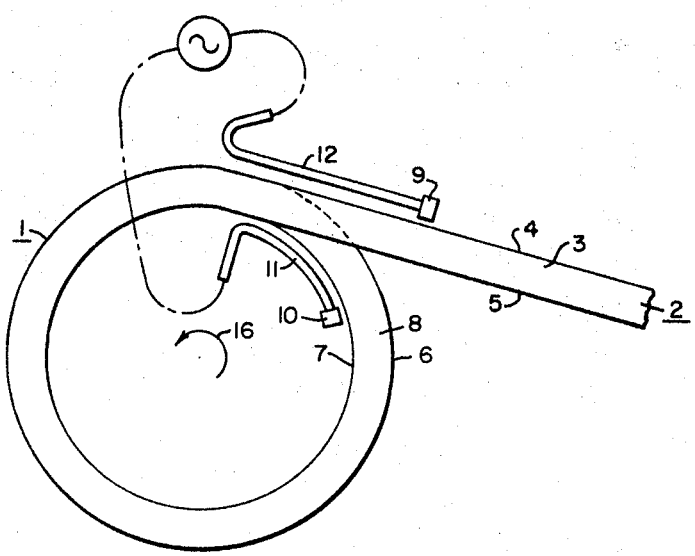

The invention will now be described in greater detail on the basis of the appended drawings, in which:

FIGURE 1 is a plan view of an exemplification of the novel apparatus for conductive spiral seam welding of metal tubes; and FIG. 2 is an end view of such apparatus, taken in the direction of arrow II in FIG. 1.

Referring to FIGS. 1 and 2, steel tube 1, which has winding-axis 15, is wound screw-fashion in the direction of arrow 16 from metal strip 2 advanced tangentially theretoward. At the welding location 13 where tube and strip meet, the heated edges 3 and 8 are welded together so that a spiral seam-weld 14 is formed on the tube, the strength of the weld being a decisive factor in the quality of the tube.

The heating of edges 3 and 8 is effected conductively. For this purpose, position-adjustable current-lead contacts 9 and 10 are provided on the outer surface 4 of the contiguous strip 2 and on the inner surface 7 of tube 1 in the region of the edges 3 and 8 ahead of welding-location 13, the said contacts being connected via position-adjustable lead-members 11 and 12 respectively, of lowest possible inductance, to a high frequency supply (not shown) having a frequency of 400 kilocycles, for example. The edges are heated and welded together at the point of junction by the current which flows from a contact 9 or 10 to the point of welding 13 and from the point of welding to the other contact. Because of the oppositely directed currents, the current density at surfaces 5 and 6 tends to be greater, and at surfaces 4 and 7 to be reduced. In order to prevent this from occurring and to obtain uniform heating, the lead member 12 to contact 9 and near the surface 4 of strip 2, is directed along the edge 3 away from the welding site 13. Because of the differing directions of flow of the weld current in the vicinity of the edge 3 of the strip 2 and of the current in lead member 12, some current along edge-face 3 is drawn toward upper surface 4 to offset the attraction which the welding current in edge-face 8 has on such edge-face 3 current, so that fairly uniform heating is effected thicknesswise along the edge-face of the strip 2.

The same effect is obtained in tube 1, where lead member 11 of the other contact 10 is located in similar manner. This may be seen clearly in FIG. 2 where the parts are given the same identifying numbers as in FIG. 1. It can be seen quite clearly from the figures that conductor 11 associated with internal contact 10 follows the shape of the tube almost up to welding-site 13. As a result, improvement in current density distribution is also produced in edge-face 8 of the tube.

For the sake of clarity, the winding and supporting apparatus for the tube and the strip are not shown. Also not shown is the apparatus for shifting the positions of the contacts and leads 11 and 12 whereby, for example, it is possible to change the distances *a* and *b* (FIG. 1) of the leads from the edge-faces and thereby obtain the optimum welding quality in every case.

Furthermore, by means of the invention, it is possible to obtain uniform heating with beveled edge-faces of strip or tube. Because a sharp edge heats up faster than the rest, it is possible, by a suitable arrangement of current-leads, to produce a current distribution on the side facing the sharp edge so that a uniform heating of the edge-face results.

What is claimed is:

1. In apparatus for conductive welding of spiral tubes in which a metal strip is advanced tangentially to a point of welding junction between its one edge and a circumferential edge of a helical seam tube being wound from such strip, comprising one contact engaging the inner surface of the tube near its circumferential edge in advance of the point of welding junction, a second contact engaging the outer surface of the strip near its said one edge in advance of the point of welding junction, and lead members for the two contacts located in proximity to the inner surface of the tube and the outer surface of the metal strip, respectively, aligned in the direction of their respective edges to be joined by welding, and extending between the point of welding junction and such contacts.

2. The apparatus of claim 1, wherein the contacts and the lead members are movable.

References Cited

UNITED STATES PATENTS

| | | | |
|---|---|---|---|
| 2,873,353 | 2/1959 | Rudd | 219—62 |
| 3,004,136 | 10/1961 | Peterson | 219—67 |
| 3,140,378 | 7/1964 | Benninghoff | 219—107 X |
| 3,359,402 | 12/1967 | Rieppel | 219—62 X |

RICHARD M. WOOD, *Primary Examiner.*

B. A. STEIN, *Assistant Examiner.*

U.S. Cl. X.R.

219—8.5, 59